US012573060B2

(12) United States Patent
Kim et al.

(10) Patent No.: US 12,573,060 B2
(45) Date of Patent: Mar. 10, 2026

(54) LOCKED-ON TARGET BASED OBJECT TRACKING METHOD AND PORTABLE TERMINAL THEREFOR

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 106 days.

(21) Appl. No.: 18/340,318

(22) Filed: Jun. 23, 2023

(65) Prior Publication Data

US 2024/0005530 A1 Jan. 4, 2024

Related U.S. Application Data

(63) Continuation of application No. PCT/KR2022/019010, filed on Nov. 29, 2022, and a
(Continued)

(30) Foreign Application Priority Data

Jun. 29, 2022 (KR) ........................ 10-2022-0080041
Sep. 30, 2022 (KR) ........................ 10-2022-0125389
(Continued)

(51) Int. Cl.
*G06T 7/246* (2017.01)
*G06V 10/70* (2022.01)
(Continued)

(52) U.S. Cl.
CPC .............. *G06T 7/248* (2017.01); *G06V 10/70* (2022.01); *H04N 23/61* (2023.01);
(Continued)

(58) Field of Classification Search
CPC .......... G06T 7/248; G06T 2207/30244; G06T 2207/20081; G06T 2207/10016;
(Continued)

(56) References Cited

U.S. PATENT DOCUMENTS

| | | | |
|---|---|---|---|
| 10,325,169 B2 * | 6/2019 | Bar-Nahum | ........... G06V 20/41 |
| 11,335,012 B2 | 5/2022 | Kim et al. | |

(Continued)

FOREIGN PATENT DOCUMENTS

| | | | | |
|---|---|---|---|---|
| CN | 105247856 A1 * | 1/2016 | ............ | G01S 17/66 |
| CN | 109726683 A | 5/2019 | | |

(Continued)

*Primary Examiner* — Loi H Tran
(74) *Attorney, Agent, or Firm* — NSIP Law

(57) ABSTRACT

According to one technical aspect of the present invention, a locked-on target based object tracking method is a method that is performed in a portable terminal and provides an object tracking function to a recorded video captured for a forward view of the portable terminal. The locked-on target based object tracking method includes setting a tracking object, identifying an object which is existing in a frame image of the recorded video using a first artificial intelligence model and setting the object as a selected object, the object and the tracking object belong to the same, and determining whether the selected object set by the first artificial intelligence model and the tracking object belong to the same object using a second artificial intelligence model trained in a different way from the first artificial intelligence model.

20 Claims, 16 Drawing Sheets

Related U.S. Application Data continuation of application No. PCT/KR2022/018565, filed on Nov. 23, 2022.

(30) Foreign Application Priority Data

| Nov. 15, 2022 | (KR) | ........................ 10-2022-0152262 |
| Nov. 29, 2022 | (KR) | ........................ 10-2022-0162112 |

(51) Int. Cl.

| *H04N 23/61* | (2023.01) |
| *H04N 23/611* | (2023.01) |
| *H04N 23/63* | (2023.01) |

(52) U.S. Cl.
CPC ......... *H04N 23/611* (2023.01); *H04N 23/632* (2023.01); *H04N 23/633* (2023.01); *G06T 2200/24* (2013.01); *G06T 2207/10016* (2013.01); *G06T 2207/20081* (2013.01); *G06T 2207/30244* (2013.01)

(58) Field of Classification Search
CPC ....... G06T 2200/24; G06T 2207/20084; G06T 2207/30196; G06T 7/246; H04N 23/632; H04N 23/611; H04N 23/61; H04N 23/633; H04N 23/815; G06V 10/70; G06V 10/25; G06V 20/52; G06V 10/82
USPC ......................................................... 348/169
See application file for complete search history.

(56) References Cited

U.S. PATENT DOCUMENTS

| 11,423,666 B2 | 8/2022 | Li et al. |
| 11,450,131 B2 | 9/2022 | Matsuo |
| 11,468,675 B1 * | 10/2022 | Agarwal ............ G06Q 30/0643 |
| 2005/0004761 A1 * | 1/2005 | Takahama ............. G01S 17/931 |
| | | 348/148 |
| 2016/0019764 A1 * | 1/2016 | Takiguchi ............... G01S 17/04 |
| | | 348/143 |
| 2017/0148174 A1 | 5/2017 | Kim et al. |
| 2017/0323481 A1 * | 11/2017 | Tran ..................... H04N 23/611 |
| 2018/0101744 A1 * | 4/2018 | Bar-Nahum ........... G06V 20/13 |
| 2019/0045137 A1 * | 2/2019 | Kamiya ................. H04N 23/95 |
| 2021/0067699 A1 * | 3/2021 | Huang ................... H04N 23/10 |
| 2021/0073558 A1 | 3/2021 | Li et al. |
| 2021/0248361 A1 | 8/2021 | Matsuo |
| 2022/0122273 A1 | 4/2022 | Kim et al. |
| 2022/0138493 A1 | 5/2022 | Lee et al. |
| 2022/0265233 A1 * | 8/2022 | Boddington ........... A61B 90/37 |
| 2022/0270326 A1 * | 8/2022 | Marghidanu ........... A63F 13/60 |
| 2023/0319426 A1 * | 10/2023 | Senapathy .......... G06Q 10/087 |
| | | 348/144 |

FOREIGN PATENT DOCUMENTS

| CN | 109726683 B | 6/2021 | |
| JP | 2016-127571 A | 7/2016 | |
| JP | 2021-124669 A | 8/2021 | |
| JP | 2021-524093 A | 9/2021 | |
| JP | 7153090 B2 | 10/2022 | |
| KR | 10-2017-0059266 A | 5/2017 | |
| KR | 10-2018-0097944 A | 9/2018 | |
| KR | 10-2021-0024124 A | 3/2021 | |
| KR | 10-2295183 B1 | 8/2021 | |
| KR | 10-2022-0052620 A | 4/2022 | |
| KR | 10-2022-0059194 A | 5/2022 | |
| KR | 10-2410268 B1 | 6/2022 | |
| WO | WO-2018162666 A1 * | 9/2018 | ........... G01S 13/931 |
| WO | WO 2020/134557 A1 | 7/2020 | |

* cited by examiner

100

FRAME IMAGE

FIRST ARTIFICIAL INTELLIGENCE MODEL

SECOND ARTIFICIAL INTELLIGENCE MODEL

TRACKING CONTROL

TRACKING CONTROL SIGNAL

LOCKED-ON TARGET BASED OBJECT TRACKING METHOD AND PORTABLE TERMINAL THEREFOR

CROSS-REFERENCE TO RELATED APPLICATIONS

Pursuant to 35 USC 120 and 365(c), this application is a continuation of International Application No. PCT/KR2022/018565 filed on Nov. 23, 2022 and PCT Application No. PCT/KR2022/019010 filed on Nov. 29, 2022, in the Korean Intellectual Property Office, and claims the benefit under 35 USC 119(a) of Korean Patent Application No. 10-2022-0080041 filed on Jun. 29, 2022, Korean Application No. 10-2022-0125389 filed on Sep. 30, 2022, Korean Patent Application No. 10-2022-0152262 filed on Nov. 15, 2022, and Korean Patent Application No. 10-2022-0162112 filed on Nov. 29, 2022, in the Korean Intellectual Property Office, the disclosures of which are incorporated herein by reference.

BACKGROUND

1. Field

The present invention relates to a locked-on target based object tracking method and a portable terminal therefor.

2. Description of the Related Art

With the development of portable terminals, the miniaturization and portability of portable terminals are being promoted, and a user-friendly computing environment is being developed.

As a user's main interest in such a computing environment, there is a tracking function for tracking an object of interest in an image being captured.

In the conventional case, for object tracking, a separate device for identifying the object and changing a directing direction of a camera according to the movement of the object is required. As an example of such related art, there is Korean Patent Laid-Open Publication No. 10-2020-0001419 and the like.

However, the related art has a limitation in that a human object to be tracked changes when several people entering one screen at the same time or when a person to be tracked temporarily leaves a screen, and as a result, has a problem that object tracking actually fails.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One technical aspect of the present application is to solve the problems of the related art, and according to an embodiment disclosed in the present application, an object of the present application is to provide tracking more effectively by more quickly and accurately performing identification and identity determination of an object using an individually trained deep learning object recognition model and a deep-learned object identification model.

According to an embodiment disclosed in the present application, an object of the present application is to perform object identity determination faster and with fewer resources by determining the same object based on similarity comparison for object identifiers derived from an object identification model.

Aspects of the present application are not limited to the above-described aspects. That is, other aspects that are not described may be obviously understood by those skilled in the art from the following specification.

One technical aspect of the present application provides a locked-on target based object tracking method. The locked-on target based object tracking method is a method that is performed in a portable terminal and provides an object tracking function to a recorded video captured for a forward view of the portable terminal. The locked-on target based object tracking method includes setting a tracking object, identifying an object which is existing in a frame image of the recorded video using a first artificial intelligence model and setting the object as a selected object, wherein the object and the tracking object belong to the same type, and determining whether the selected object set by the first artificial intelligence model and the tracking object belong to the same type using a second artificial intelligence model trained in a different way from the first artificial intelligence model.

Another technical aspect of the present invention provides a portable terminal. The portable terminal includes a memory configured to store one or more instructions; and at least one processor configured to execute the one or more instructions stored in the memory. The at least one processor executes the one or more instructions to receive a recorded video captured at a first resolution from a camera unit, set a tracking object, identify an object which is existing in a frame image of the recorded video using a first artificial intelligence model and set the object as a selected object, wherein the object and the tracking object belong to the same type, and determine whether the selected object set by the first artificial intelligence model and the tracking object belong to the same type using a second artificial intelligence model trained in a different way from the first artificial intelligence model.

Another technical aspect of the present invention provides a storage medium. The storage medium is a storage medium that stores computer-readable instructions. When executed by a portable terminal, the instructions cause the portable terminal to set a tracking object, identifying an object which is existing in a frame image of the recorded video using a first artificial intelligence model and setting the object as a selected object, wherein the object and the tracking object belong to the same type, and determine whether the selected object set by the first artificial intelligence model and the tracking object belong to the same type using a second artificial intelligence model trained in a different way from the first artificial intelligence model.

The means for solving the above problems do not enumerate all the features of the present application. Various units for solving the problems of the present application may be understood in more detail with reference to specific embodiments of the following detailed description.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
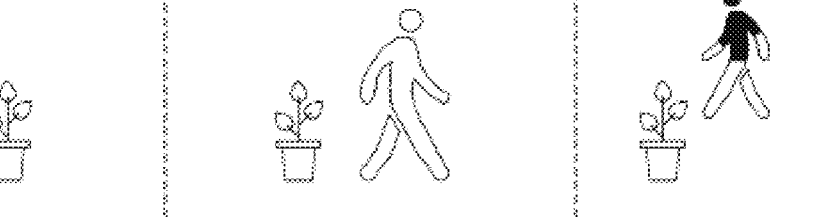
FIG. 1 is a diagram illustrating a locked-on target based object tracking technology according to an embodiment of the present application.
Figure 1:
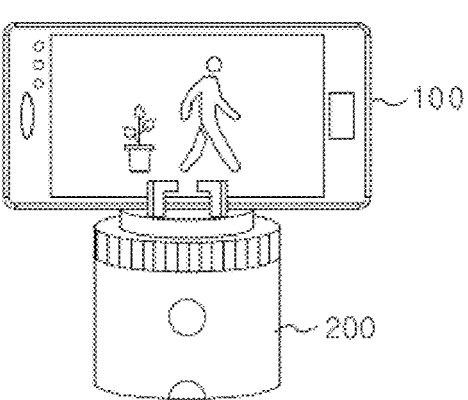

Hereinafter, exemplary embodiments of the present invention will be described with reference to the accompanying drawings.

However, embodiments of the present invention may be modified into many different forms and the scope of the present disclosure is limited to the embodiments set forth herein. In addition, these embodiments of the present invention are provided so that the present disclosure will completely describe the present disclosure to those skilled in the art.

That is, the above-described objects, features, and advantages will be described below in detail with reference to the accompanying drawings, and accordingly, those skilled in the art to which the present invention pertains will be able to easily implement the technical idea of the present invention. When it is decided that the detailed description of the known art related to the present invention may unnecessary obscure the gist of the present invention, a detailed description therefor will be omitted. Hereinafter, exemplary embodiments of the present disclosure will be described in detail with reference to the accompanying drawings. In the drawings, the same reference numerals are used to indicate the same or similar components.

In addition, singular forms used in the specification are intended to include plural forms unless the context clearly indicates otherwise. In the specification, it is to be noted that the terms "comprising," "including," and the like are not be construed as necessarily including several components or several steps described in the specification and some of the above components or steps may not be included or additional components or steps are construed as being further included.

In addition, in order to describe a system according to the present invention, various components and sub-components thereof will be described below. These components and their sub-components may be implemented in various forms, such as hardware, software, or a combination thereof. For example, each element may be implemented as an electronic configuration for performing a corresponding function, or may be implemented as software itself that can be run in an electronic system or as one functional element of such software. Alternatively, it may be implemented as an electronic configuration and driving software corresponding thereto.

Various techniques described in the present specification may be implemented with hardware or software, or a combination of both if appropriate. As used in the present specification, the terms "unit," "server," "system," and the like refer to a computer-related entity, that is, hardware, a combination of hardware and software, as equivalent to software or software in execution. In addition, each function executed in the system of the present invention may be configured in module units and recorded in one physical memory or distributed between two or more memories and recording media.

Various embodiments of the present disclosure may be implemented as software (for example, program) including one or more instructions stored in a storage medium readable by a machine (for example, portable terminal 100). For example, a processor 160 may call and execute at least one instruction among one or more instructions stored from the storage medium. This makes it possible for the device to be operated to perform at least one function according to the at least one instruction called. The one or more instructions may include codes generated by a compiler or codes executable by an interpreter. The machine-readable storage medium may be provided in the form of a non-transitory storage medium. Here, the "non-transitory" means that the storage medium is a tangible device, and does not include a signal (for example, electromagnetic waves), and the term does not distinguish between the case where data is stored semi-permanently on a storage medium and the case where data is temporarily stored thereon.

Although various flowcharts are disclosed to describe the embodiments of the present invention, this is for convenience of description of each step, and each step is not necessarily performed according to the order of the flowchart. That is, each operation in the flowchart may be performed simultaneously with each other, performed in an order according to the flowchart, or may be performed in an order opposite to the order in the flowchart.

FIG. 1 is a diagram illustrating a locked-on target based object tracking technology according to an embodiment of the present application.

Referring to FIG. 1, a portable terminal 100 captures a recorded video in a forward direction and identifies an object in the recorded video. The portable terminal 100 performs tracking so that the identified object is located in the recorded video. For example, the recorded video consist of consecutive frame images, and the frame images include a person's whole body appearance.

The portable terminal 100 may identify a tracking object among various selected objects in the recorded video and track only the tracking object. In the case of identifying an object using an artificial intelligence model, there is an advantage in that the object is quickly and accurately identified, but it is difficult to track only a single object in that each object is identified without being specified. For example, in the case of tracking a human object and using only an artificial intelligence model that searches for a human object, when a situation such as when several people appear on a screen or a person leaves a screen for a while occurs, a problem occurs that a person being tracked changes. In an embodiment of the present application, by using artificial intelligence models trained differently, it is possible to determine whether the selected objects and tracking object belong to the same type, so only the tracking object may be tracked.

Tracking can be implemented in various ways.

For example, as in the example illustrated in FIG. 1, the portable terminal 100 controls driving of a device cradle 200 so that the front of the portable terminal 100 is directed toward an object, thereby performing tracking.

As another example, as will be described below with reference to FIG. 13 below, by partially changing and setting a display window (referred to as a viewing window) set at a resolution lower than a capturing resolution of the portable terminal 100 in the recorded video, a tracking function based on software may be provided to a user as if the tracking occurs.

The portable terminal 100 may include a camera and may be a user-portable electronic device. For example, the portable terminal 100 may include a mobile phone, a smart phones, a laptop computer, a digital broadcasting terminal, personal digital assistants (PDA), a portable multimedia player, navigation, a slate PC, a tablet PC, an ultrabook, a wearable device (e.g., smartwatch, smart glass, head mounted display), and the like.

The portable terminal 100 and a locked-on target based object tracking method performed by the portable terminal 100 will be described with reference to FIGS. 2 to 16 below.

Figure 2:
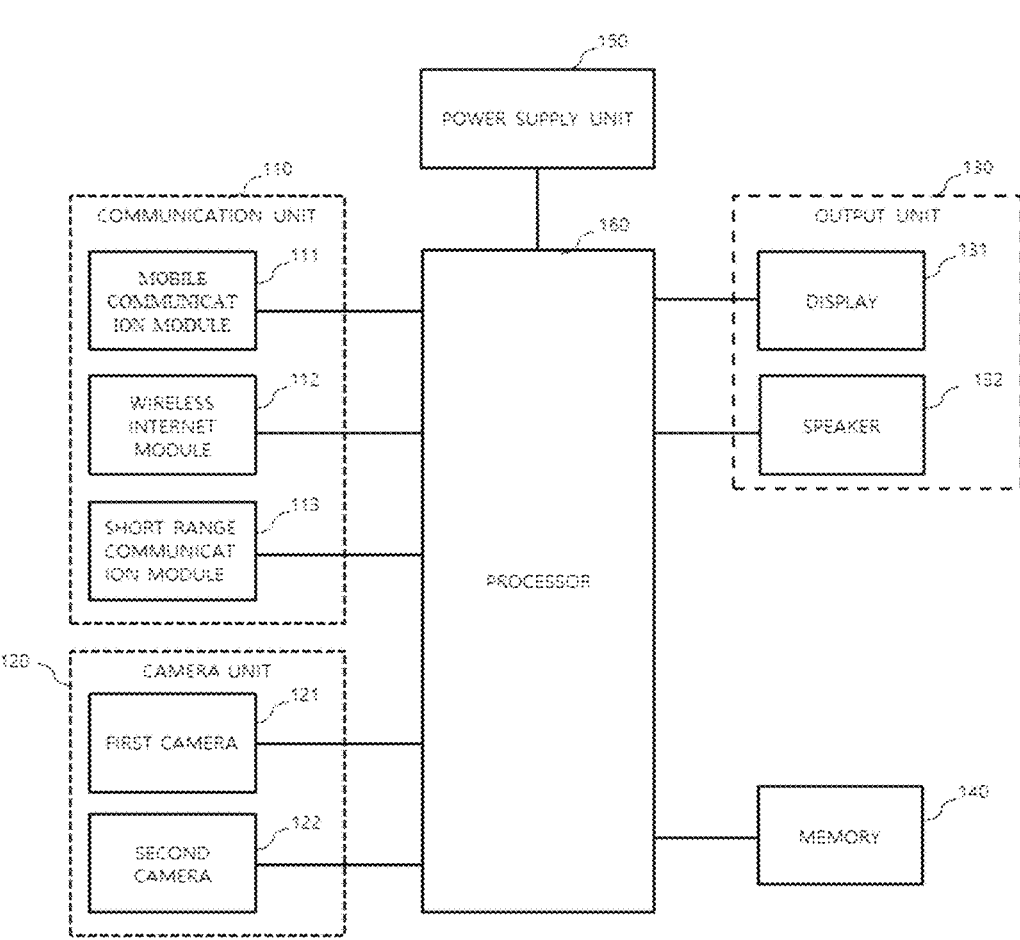
FIG. 2 is a diagram illustrating an exemplary computing environment of a portable terminal according to an embodiment of the present application.

FIG. 2 is a diagram illustrating an exemplary computing operating environment of a portable terminal according to an embodiment of the present application.

Referring to FIG. 2, the portable terminal 100 includes a communication unit 110, a camera unit 120, an output unit 130, a memory 140, a power supply unit 150, and a processor 160. The components illustrated in FIG. 2 are not essential to implementing the portable terminal, so the portable terminal described herein may have more or fewer components than those listed above.

The communication unit 110 may include one or more modules enabling communication between the portable terminal 100 and a wireless communication system or between the portable terminal 100 and other portable terminals. The communication unit 110 may include a mobile communication module 111, a wireless Internet module 112, and a short range communication module 113. The short range communication module 113 may perform a communication connection with the device cradle 200 in a wired or wireless manner. For example, the short range communication module 113 may include a short range wireless communication module such as Bluetooth or a wired communication module such as RS232.

The camera unit 120 or the camera module may include at least one camera. The camera unit 120 may include one or more lenses, image sensors, image signal processors, or flashes.

For example, the camera unit 120 may include a first camera 121 and a second camera 122. The first camera 121 or the second camera 122 may capture a forward video of the portable terminal 100.

The output unit 130 is for generating an output related to sight, hearing, or touch, and may include a display 131 and a speaker 132. The display 131 may form a layer structure with or is integrally formed with the touch sensor, thereby implementing a touch screen. The touch screen may function as a user input unit which provides an input interface between the portable terminal 100 and a user, and may provide an output interface between the portable terminal 100 and the user.

The power supply unit 150 receives power from an external power supply and an internal power supply and supply the received power to each component included in the portable terminal 100 under the control of the processor 160. The power supply unit 150 includes a battery, which may be a built-in battery or a replaceable battery.

The processor 160 may control at least some of the components described with reference to FIG. 2 in order to drive an application program stored in the memory 140, that is, the application. In addition, the processor 160 may operate at least two or more of the components included in the portable terminal 100 in combination with each other in order to drive the application program.

The processor 160 may drive an application by executing instructions stored in the memory 140. In the following description, the processor 160 is expressed as a subject of control, instruction, or function by driving an application, but this means that the processor 160 operates by driving instructions or applications stored in the memory 140.

At least some of the components may operate in cooperation with each other in order to implement an operation, a control, or a control method of the portable terminal 100 according to various embodiments described below. Also, the operation, control, or control method of the portable terminal 100 may be implemented on the portable terminal by driving at least one application program stored in the memory 140.

The processor 160 generally controls the overall operation of the portable terminal 100 in addition to the operation related to the application program. The processor 160 may provide or process appropriate information or a function to a user by processing signals, data, information, and the like, which are input or output through the above-described components, or by driving an application program stored in the memory 140. The processor 160 may be implemented as one processor or a plurality of processors.

Components of FIG. 7 described below may be functions or software modules implemented in the processor 160 according to instructions stored in the memory 140.

Meanwhile, the control method performed by the portable terminal 100 according to the above-described embodiment may be implemented as a program and provided to the portable terminal 100. For example, a program including the control method of the portable terminal 100 may be provided by being stored in a non-transitory computer readable medium.

Figure 3:
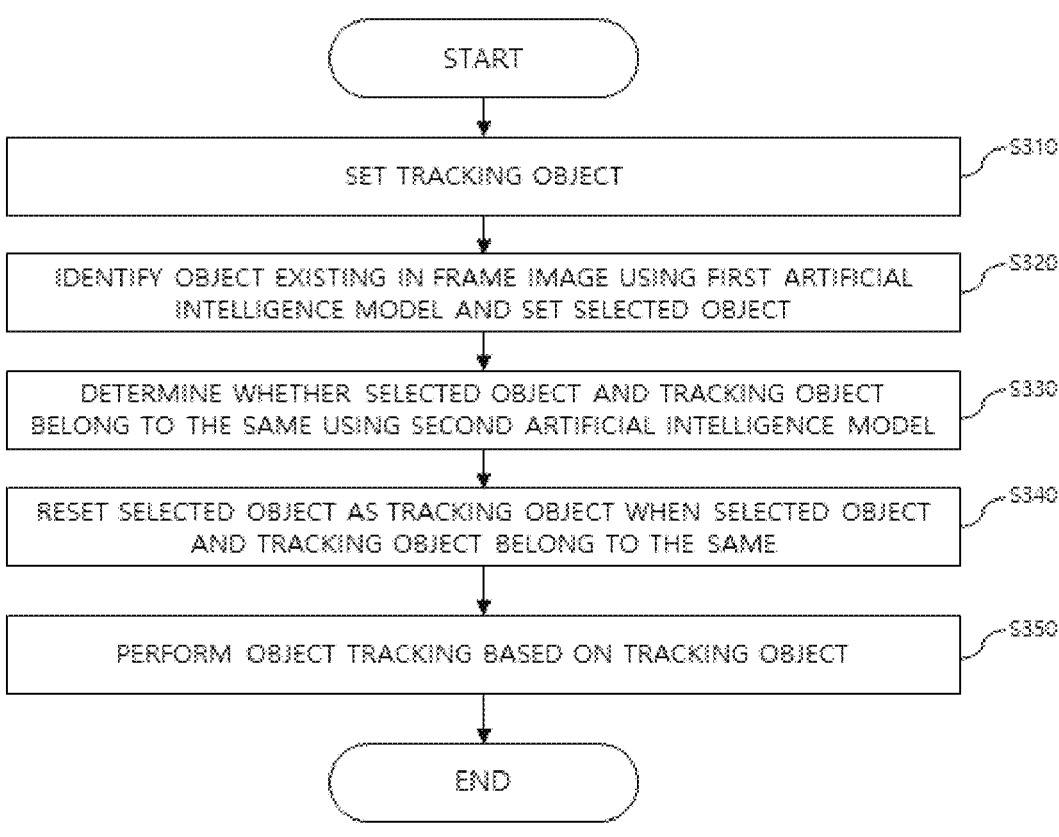
FIG. 3 is a flowchart illustrating a locked-on target based object tracking method according to an embodiment of the present application.

FIG. 3 is a flowchart for describing a locked-on target based object tracking method according to an embodiment of the present application, and the method for providing object tracking illustrated in FIG. 3 is described in each step performed by the driving of the processor 160 of the portable terminal 100 illustrated in FIG. 2.

Figure 4:
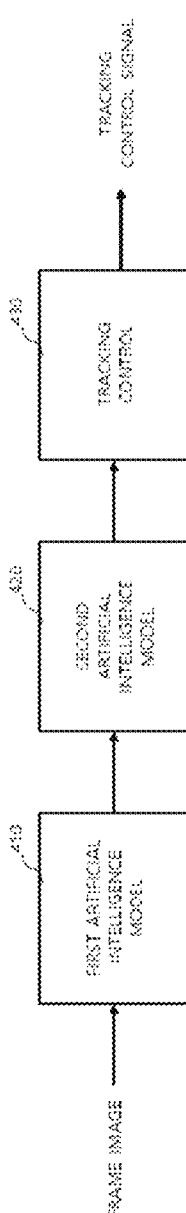
FIG. 4 is a diagram illustrating the locked-on target based object tracking method according to the embodiment of the present application.

FIG. 4 is a diagram for describing the locked-on target based object tracking method according to an embodiment of the present application, and specifying a tracking object using first and second artificial intelligence models will be described.

Hereinafter, description will be made with reference to FIGS. 3 and 4.

Referring to FIG. 4, the portable terminal 100 may prepare the first and second artificial intelligence models.

For example, the memory 140 may store artificial intelligence models according to various embodiments of the present disclosure.

An artificial intelligence model according to an embodiment is an artificial intelligence algorithm based determination model trained based on a plurality of video, and may be a model based on a neural network. The trained determination model may be designed to simulate a human brain structure on a computer, and may include a plurality of network nodes simulating neurons of a human neutral network and having weights. The plurality of network nodes may form a connection relationship with each other to simulate synaptic activity of the neurons transmitting and receiving signals through synapses. In addition, the trained determination model may include, for example, a machine learning model, a neutral network model or a deep learning model developed from the neutral network model. In the deep learning model, the plural of network nodes may be positioned at different depths (or layers), and may transmit and receive data depending on a convolution connection relationship.

For example, the artificial intelligence model may be a convolution neural network (CNN) model trained based on an image. The CNN is a multilayer neural network with a special connection structure designed for voice processing, image processing, and the like. Meanwhile, of course, the artificial intelligence model is not limited to the CNN. For example, the learning network model is implemented as a deep neural network (DNN) model of at least one of a recurrent neural network (RNN), a long short term memory network (LSTM), gated recurrent units (GRU), and generative adversarial networks (GAN).

Meanwhile, the memory 140 according to the embodiment of the present disclosure may store a plurality of learning network models of the same type or of different types. However, according to another embodiment, of course, at least one learning network model according to various embodiments of the present disclosure may be stored in at least one of an external device and an external server.

A first artificial intelligence model 410 is trained with an image in which a type of tracking object is displayed, and when there is a type of selected object in the image, may identify the type of selected object. That is, the first artificial intelligence model 410 may be an artificial intelligence model that is deep-learned with a plurality of training image sets including the type of tracking object and identifies an object corresponding to the type of tracking object existing in the frame image. For example, taking a person as a tracking object, the first artificial intelligence model may be, for example, an artificial neural network model that is provided with a plurality of training images displaying various appearances of a person and is trained to identify and classify human objects in the images.

The second artificial intelligence model 420 may be a model trained to determine the identity of the identified human object.

In an embodiment, the second artificial intelligence model 420 may be an artificial intelligence model trained to generate feature data for identity between a default image and a training image with respect to the default image and the training image modified based on the default image. For example, the default image and the training image are images including of a person's whole body appearance.

For example, the second artificial intelligence model 420 may receive a reference object (tracking object) and a comparison object (selected object) and generate similarity data (e.g., feature vector) for the reference object. The generated similarity data may be used to determine whether the comparison object is similar to the reference object.

As another example, the second artificial intelligence model 420 may receive a reference object (tracking object) and a comparison object (selected object) and generate feature data (e.g., feature vector) for each object. The second artificial intelligence model 420 may generate a first feature vector for the reference object and a second feature vector for the comparison object, respectively. The first feature vector of the reference object and the second feature vector of the comparison object may be used to determine whether the comparison object is similar to the reference object.

The processor 160 may drive the artificial intelligence models 410 and 420 stored in memory, and may provide a tracking function by locking an object based on these artificial intelligence models.

Additionally describing with reference to FIG. 3, the processor 160 may set the tracking object (S310).

For example, the tracking object may be determined by a user's selection, targeting the selected object identified in the frame image.

As another example, the processor 160 may automatically set the selected object initially identified in the frame image as the tracking object.

The processor 160 may set the selected object by identifying an object existing in the frame image of the recorded video using the first artificial intelligence model 410 (S320). Here, the selected object is the object existing in the image frame and the selected object and tracking object belong to the same type. For example, when the tracking object is a person, all human objects in the image frame may be identified as selected objects.

The processor 160 may determine whether the selected object set by the first artificial intelligence model and the tracking object belong to the same object by using the second artificial intelligence model 420 (S330).

In an embodiment, the processor 160 may determine whether the selected object and the tracking object belong to the same object based on whether the similarity data between the selected object and the tracking object generated by the second artificial intelligence model 420 falls within a preset similarity range.

In an embodiment, the processor 160 may determine whether the selected object and the tracking object belong to the same object based on the similarity between the first feature vector of the selected object generated by the second artificial intelligence model 420 and the second feature vector of the tracking object.

When it is identified that the selected object and the tracking object belong to the same object, the processor 160 may track the selected object determined to be the same.

For example, when it is identified that the selected object and the tracking object belong to the same object, the processor 160 may reset the selected object to the tracking object (S340), and perform the object tracking based on the reset tracking object (S350). However, according to the embodiment, an embodiment in which the same selected object as the tracking object is a tracking target without resetting the tracking object is also possible.

When it is identified that the selected object is different from the tracking object, the processor 160 may perform the object tracking based on the location of the selected object in the previous frame image. That is, the capturing direction or the viewing window in the previous frame image may be maintained as it is.

As in the example illustrated in FIG. 1, when the device cradle 200 is used, the processor 160 may perform tracking control 430 for object tracking for the tracking object, that is, perform rotation control of the device cradle 200 for tracking. To this end, the processor 160 may generate a tracking control signal and provide the generated control signal to the device cradle 200.

Figure 5:
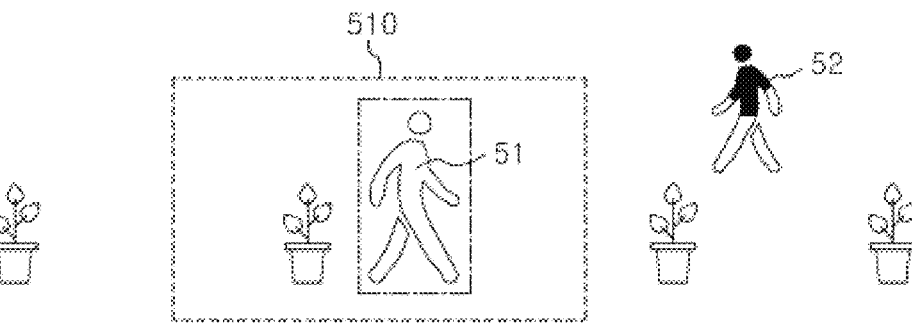
FIGS. 5 to 7 are diagrams for describing the locked-on target based object tracking method illustrated in FIG. 3.
Figure 5:
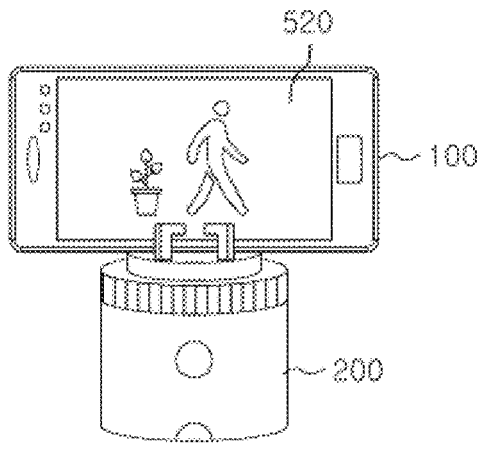
Figure 6:
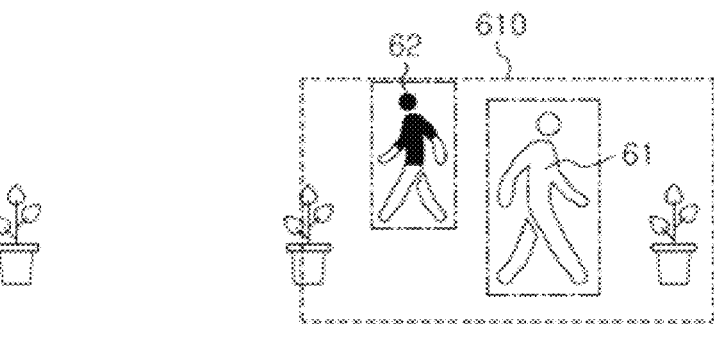
Figure 6:
Figure 6:
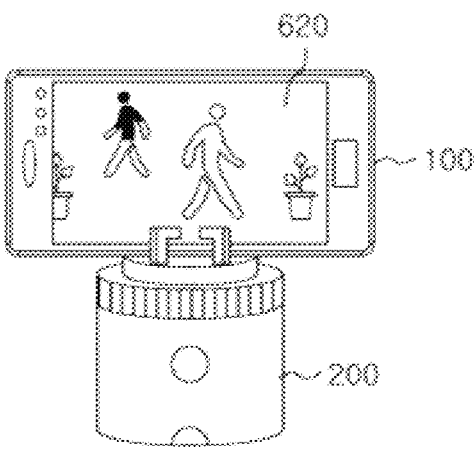
Figure 7:
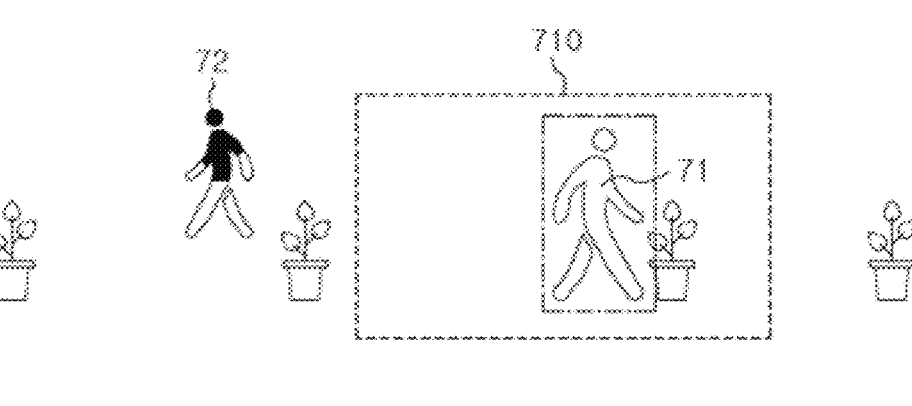
Figure 7:
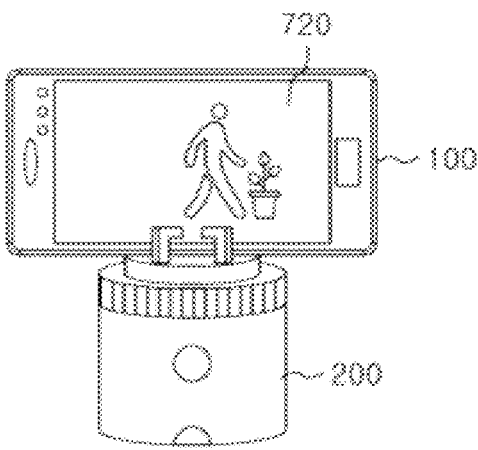

FIGS. 5 to 7 are diagrams illustrating the locked-on target based object tracking method illustrated in FIG. 3. FIG. 5 illustrates an example in which the portable terminal 100 captures a forward image and tracks a tracking object 51 to display the tracking object 51 through a user display interface 520. In the example of FIG. 5, an example in which the tracking object 51 is set is illustrated. FIG. 6 illustrates an example in which a new selected object 62 is added to an area 610 captured in a frame image. In the example of FIG. 6, the processor 160 may identify a first selected object 61 and a second selected object 62, respectively, using the first artificial intelligence model. Thereafter, the processor 160 may determine the similarity between the tracking object 51 and the first selected object 61 and the similarity between the tracking object 51 and the second selected object 62 using the second artificial intelligence model. The processor 160 may determine that the first selected object 61 is similar to the tracking object 51, while the second selected object 62 may determine that the second selected object 62 is dissimilar to the tracking object 51, and thus, may continue to track the first selected object 61. Similarly, in the example of FIG. 7, the tracking may be performed by searching for a selected object 71 searched in an area 710 captured in a frame image and determining whether the selected object 71 and the tracking object belong to the same.

Figure 8:
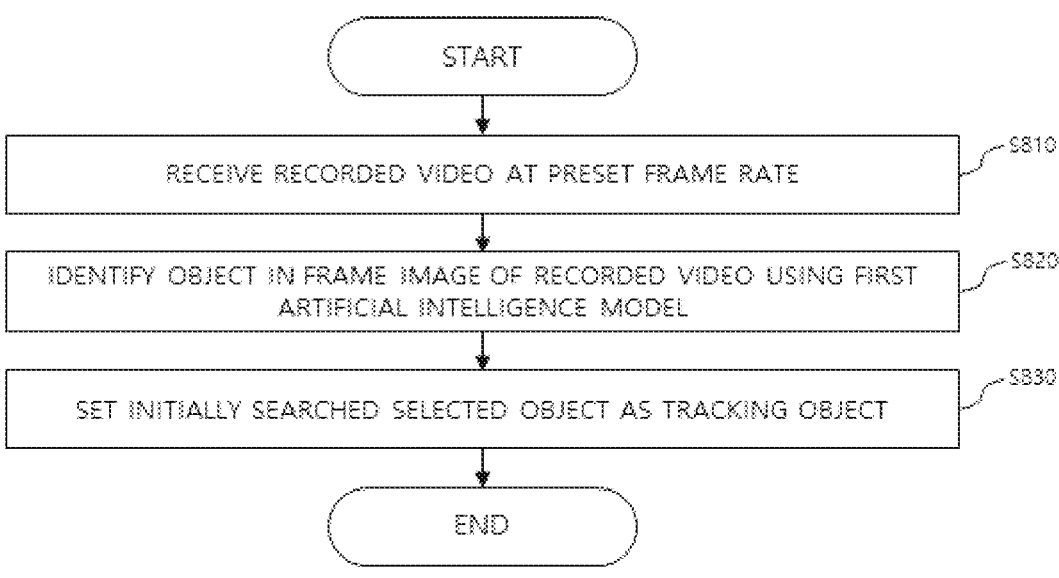
FIG. 8 is a flowchart for describing an embodiment of setting a tracking object according to an embodiment of the present application.

FIG. 8 is a flowchart for describing an embodiment of setting a tracking object according to an embodiment of the present application. An embodiment illustrated in FIG. 8 is an embodiment for describing initial setting of a tracking object.

Referring to FIG. 8, the processor 160 receives recorded video captured at a preset frame rate (S810). The processor 160 may identify an object existing in the frame image of the recorded video using the first artificial intelligence model (S820) and set the initially searched selected object as the tracking object (S830). In this embodiment, since the initially identified object (e.g., the initially identified human object) may be automatically set as the tracking target, the automatic object tracking can be conveniently performed.

Figure 9:
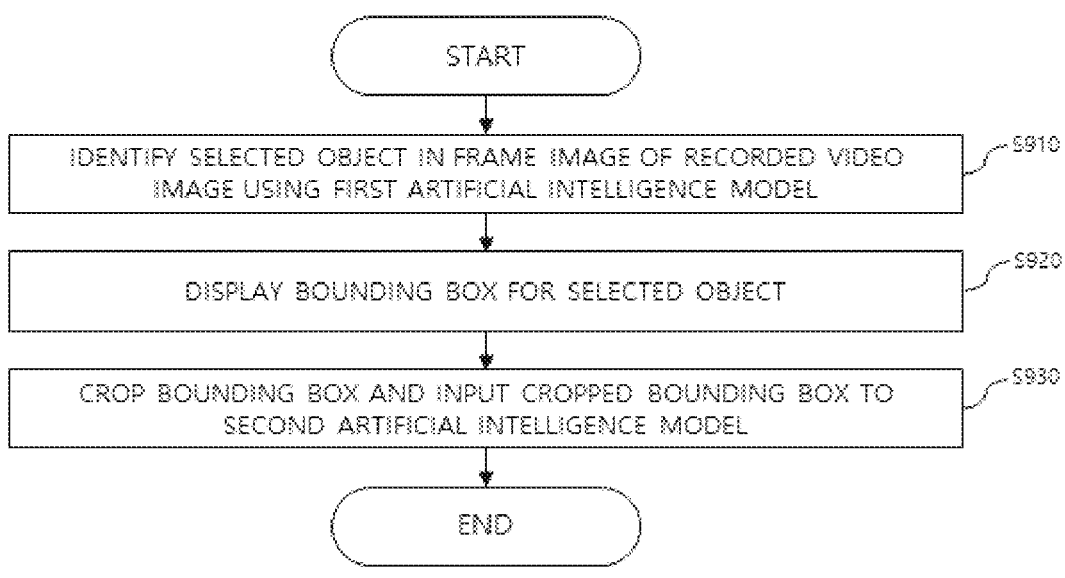
FIG. 9 is a flowchart for describing an embodiment of setting a selected object according to an embodiment of the present application.

FIG. 9 is a flowchart for describing an embodiment of setting a selected object according to an embodiment of the present application.

Referring to FIG. 9, the processor 160 may identify the selected object in the frame image of the recorded video using the first artificial intelligence model (S910).

The processor 160 may display a bounding box for the selected object (S920), crop the bounding box, and input the cropped bounding box to the second artificial intelligence model (S930). In the object 51 illustrated in FIG. 5, the bounding box is indicated by a one-dot chain line. Such a bounding box may be displayed through a user interface, or the display of the bounding box may be omitted. FIG. 6 illustrates an example in which the bounding box is set for each of the two selected objects 61 and 62.

Figure 10:
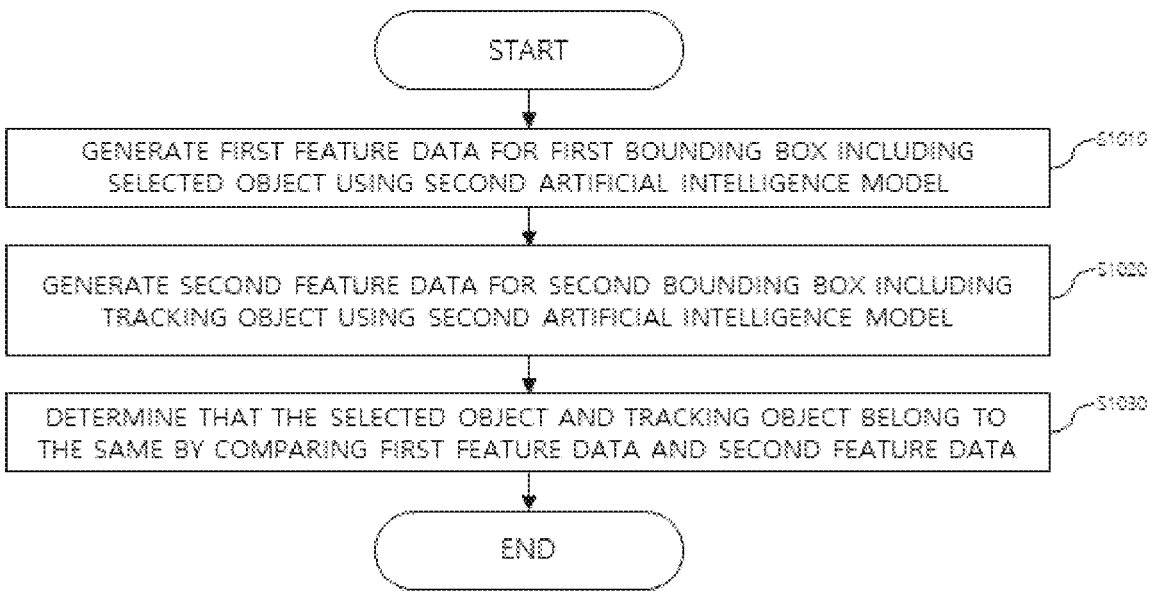
FIG. 10 is a flowchart for describing an embodiment of determining that a selected object and a tracking object belong to the same according to an embodiment of the present application.

FIG. 10 is a flowchart for describing an embodiment of determining that a selected object and a tracking object belong to the same according to an embodiment of the present application. Referring to FIG. 10, the processor 160 may generate first feature data for a first bounding box including the selected object using the second artificial intelligence model (S1010).

The processor 160 may generate second feature data for a second bounding box including the tracking object using the second artificial intelligence model (S1020).

The processor 160 may compare the first feature data and the second feature data to determine that the selected object and the tracking object belong to the same (S1030).

In an embodiment, the feature data may be a feature vector, and the processor 160 may determine whether the selected object and the tracking object belong to the same object based on the similarity between the first feature vector of the selected object generated by the second artificial intelligence model 420 and the second feature vector of the tracking object.

In an embodiment, the processor 160 may calculate a plurality of similarity values derived in different ways for the first feature vector of the selected object and the second feature vector of the tracking object, and set a similarity range for each of the plurality of similarity values. For example, the processor 160 may calculate a cosine distance value and a Euclidean distance value between the first feature vector and the second feature vector, respectively, and determine whether the two calculated values fall within the similarity threshold range of the preset cosine distance value and the similarity threshold range of the preset Euclidean distance value, in which the threshold ranges may each be set based on each learning process. When all of the plurality of similarity values fall within the similarity range, the processor 160 may determine that the selected object and the tracking object belong to the same. When at least one of the plurality of similarity values exceeds the similarity range, the processor 160 may determine that the selected object and the tracking object do not belong to the same.

Figure 11:
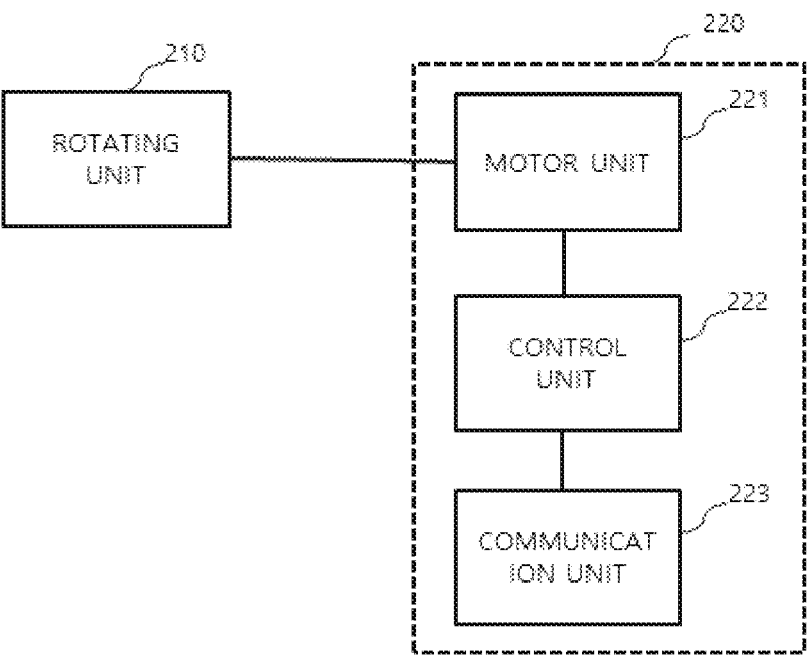
FIG. 11 is a block configuration diagram for describing a device cradle according to an embodiment of the present application.
Figure 12:
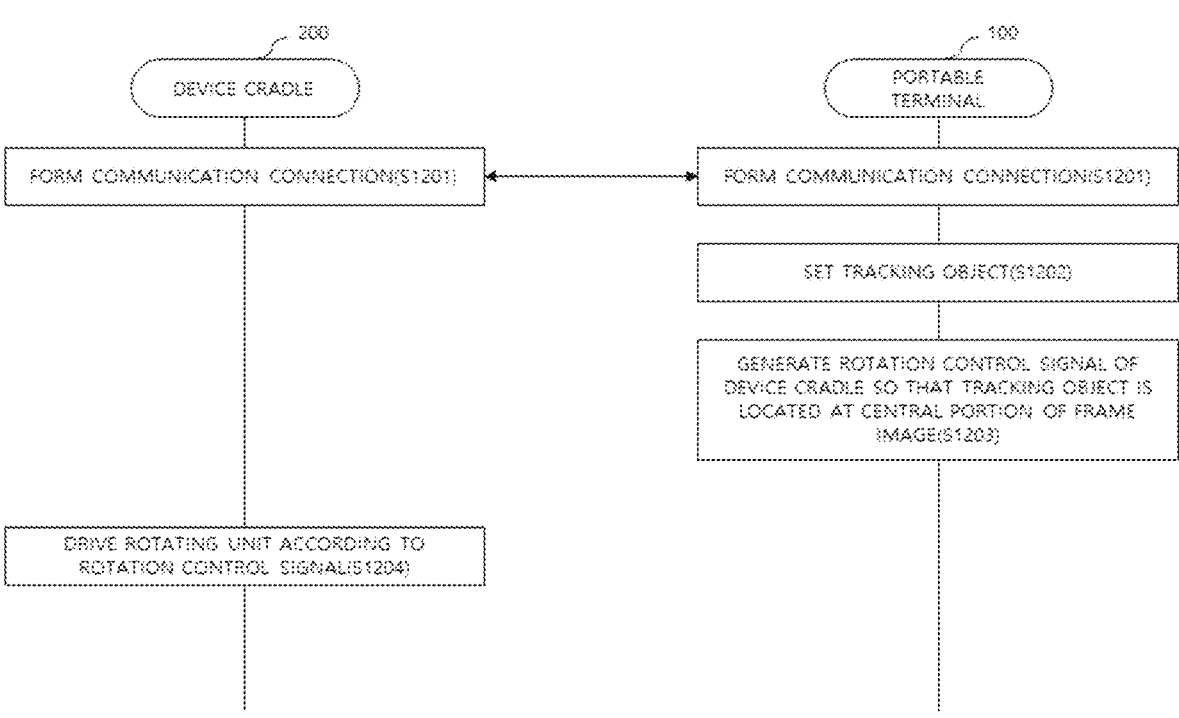
FIG. 12 is a diagram illustrating a tracking object tracking method using the device cradle according to the embodiment of the present application.

FIGS. 11 and 12 illustrate an embodiment of tracking using a device cradle capable of mounting the portable terminal and rotating a capturing direction of the portable terminal.

FIG. 11 is a block configuration diagram for describing a device cradle according to an embodiment of the present application, and FIG. 12 is a diagram illustrating a tracking object tracking method using a device cradle according to an embodiment of the present application.

Referring to FIG. 11, the device cradle 200 may include a rotating unit 210 and a body unit 220.

The portable terminal 100 is mounted on the rotating unit 210, and the rotating unit 210 may rotate by the operation of the motor unit 221. The capturing direction of the portable terminal 100 may change according to rotation of the rotating unit 210. That is, the rotating unit 210 may rotate according to the control signal provided from the portable terminal 100, and thus, operate so that the capturing direction of the portable terminal 100 mounted on the rotating unit 210 follows the tracking object. The rotation direction and rotation speed of the rotating unit 210 may change according to driving of the motor unit 221.

For example, the rotating unit 210 may include a fixing stand, a clamp, and a rotating stand. The fixing stand and the clamp may be disposed on the rotating stand. The fixing stand and the clamp may fix the portable terminal 100. The rotating stand may rotate according to the operation of the motor unit 221. To this end, the rotating stand may be mechanically connected to the motor unit 221.

The body unit 220 may include a motor unit 221, a control unit 222, and a communication unit 223. The control unit 222 may control components of the body unit 220 to control the operation of the device cradle 200.

The communication unit 223 may perform a communication connection with the portable terminal 100 and receive a control signal for driving the device cradle 200 from the portable terminal 100. For example, the communication unit 223 may establish a communication connection with the portable terminal 100 using a short range communication module or wired communication.

The control unit 222 may control the driving of the rotating unit 210 by driving the motor unit 221 in response to the control signal received through the communication unit 223.

Referring to FIG. 12, the processor 160 may control the short range communication module 113 to establish a communication connection with the device cradle 200 (S1201).

The processor 160 may control the camera unit 120 to acquire the recorded image for a forward view of the portable terminal 100, identify the selected object in the captured recorded, and then determine whether the selected object and the tracking object belong to the same. That is, as described above, the tracking object may be set in the captured recorded (S1202).

The processor 160 may control the device cradle to track the tracking object (S1203). To this end, the processor 160 may control the rotation of the device cradle 200 so that the tracking object is located at a specific location in the frame image. For example, the rotation control signal of the device cradle may be generated so that the tracking object is located at the center of the frame image (S1203).

The control unit 222 of the device cradle 200 may control the rotating unit 210 to be driven according to the received rotation control signal to provide tracking so that the front of the portable terminal follows the tracking object.

FIGS. 13 to 16 illustrate a software-based tracking method that provides a software-based tracking effect while a front position of a portable terminal is fixed.

Figure 13:
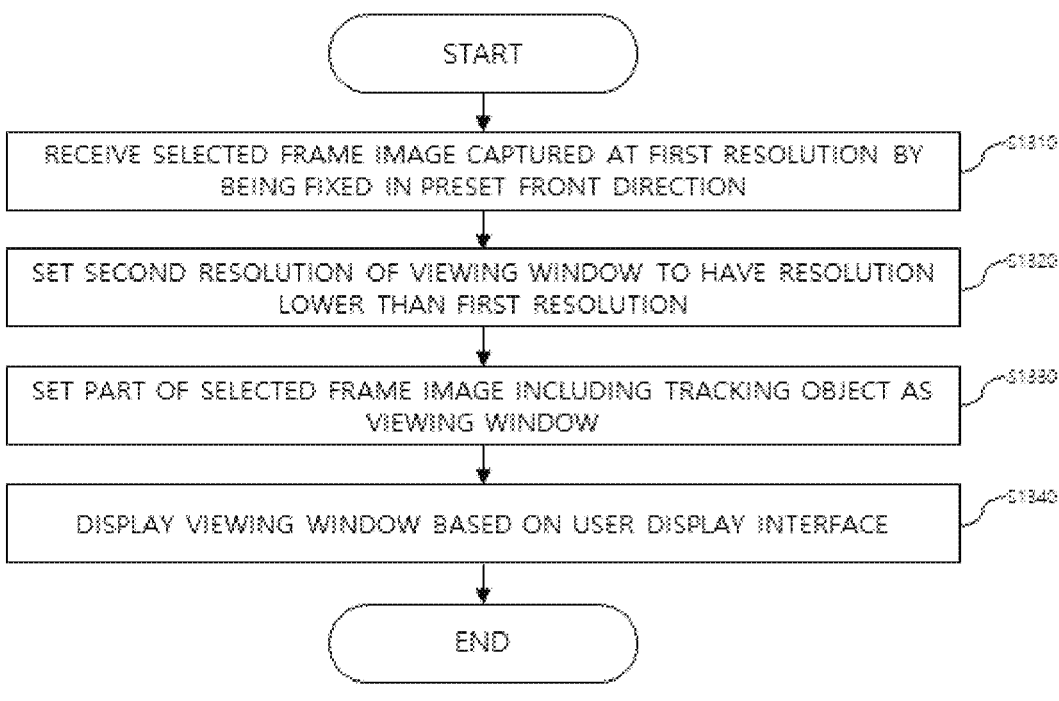
FIG. 13 is a diagram for describing a software-based tracking method according to an embodiment of the present application.
Figure 15:
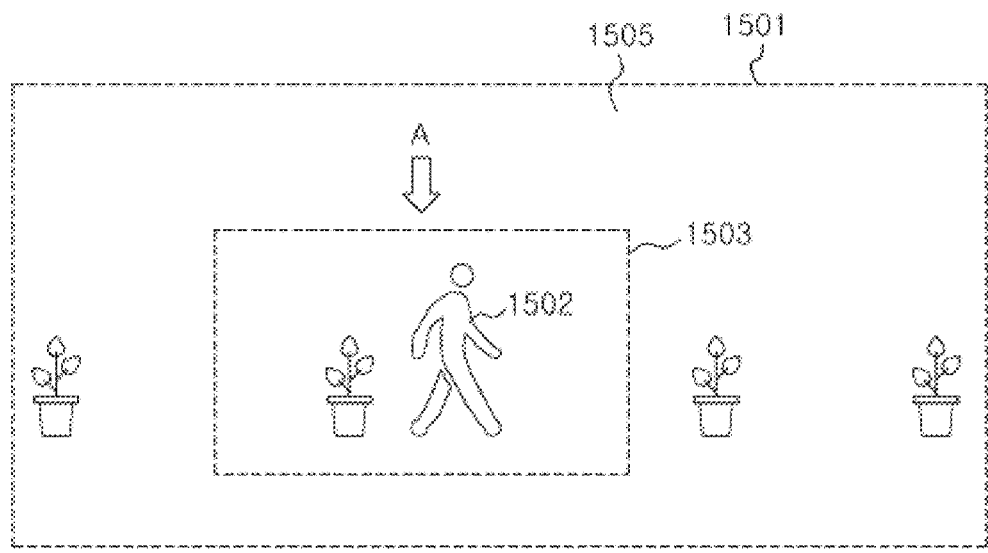
FIGS. 15 and 16 are diagrams for describing software tracking.
Figure 16:
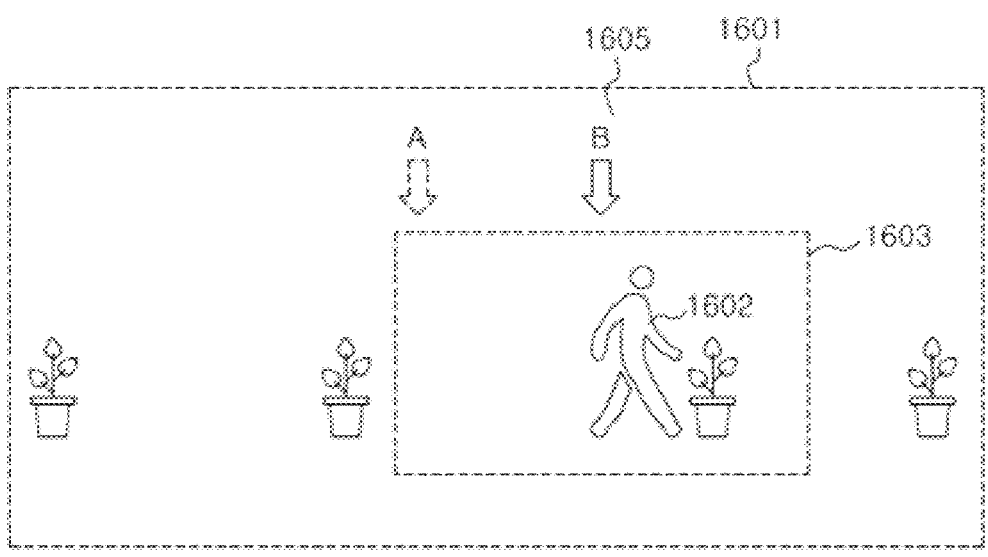

FIG. 13 is a diagram for describing a software-based tracking method according to an embodiment of the present application, and FIGS. 15 and 16 are diagrams for describing software tracking.

Referring to FIG. 13, the processor 160 controls the camera unit 120 to generate a frame image in a forward direction and receives the selected frame image (S1310). The camera unit 120 may generate a frame image by capturing images at a first resolution while being fixed in a preset forward direction regardless of whether the tracking object exists or moves.

The processor 160 may set the second resolution of the viewing window (1503 in FIG. 15) to have a resolution lower than the first resolution captured by the camera unit 120 (S1320).

For example, the resolution of the viewing window may be determined based on a user's input.

As another example, the processor 160 may dynamically change the resolution of the viewing window while providing the object tracking function according to the size of the tracking object in the frame image. For example, the resolution of the viewing window may be dynamically changed in response to the size of the bounding box of the tracking object. When the bounding box is smaller than a predetermined size, the resolution of the viewing window may be lowered correspondingly, and when the bounding box is larger than the predetermined size, the resolution of the viewing window may be set to be increased correspondingly. This is to allow the size of the tracking object (the size of the bounding box) to change within a certain range since the viewing window is an image area displayed to the user.

The processor 160 may identify the tracking object in the frame image, and set a partial area of the selected frame image including the tracking object as the viewing window based on the location of the tracking object in the selected frame image (S1330). In FIG. 15, after identifying a tracking object 1502 in a selected frame image 1501, a viewing window 1503, which is a window to be displayed through a user display interface, may be set around the tracking object.

Figure 14:
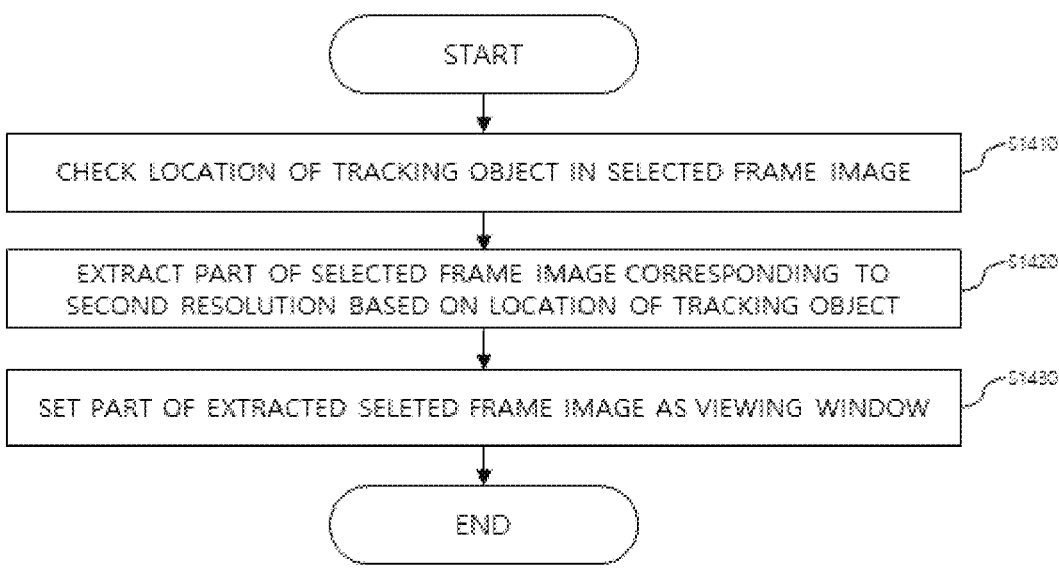
FIG. 14 is a diagram for describing an embodiment of setting a viewing window according to an embodiment of the present application.

FIG. 14 is a diagram for describing an embodiment of setting a viewing window according to an embodiment of the present application, and the setting of the viewing window will be described with further reference to FIG. 14.

Referring to FIG. 14, the processor 160 checks the location of the tracking object in the selected frame image (S1410). The processor 160 may extract a partial area of the selected frame image corresponding to the second resolution based on the location of the tracking object (S1420). For example, the tracking object may be set as the center of the second resolution area. The processor 160 may set a partial area of the extracted selected frame image as a viewing window (S1430).

Referring back to FIG. 13, the processor 160 may display the viewing window based on the user display interface (S1340). That is, only the viewing window 1503 is displayed through the user display interface, and not all of the first resolution areas, which are all the captured frame images, are displayed. That is, an area 1505 other than the viewing window is not displayed on the user display interface.

The processor 160 may repeatedly perform the above-described process of setting a viewing window for all or at least a part of the consecutive frame images (referred to as captured frame images) captured by the camera module. FIG. 16 illustrates a captured frame image 1601 captured after a certain time has elapsed from FIG. 15, and comparing FIG. 15 and FIG. 16, it can be seen that a tracking object 1602 has moved from position A to position B. The processor 160 may reset a location of a viewing window 1603 in response to the movement of the tracking object 1602. In the illustrated example, the viewing window may be set by moving to the right based on the tracking object 1602. Accordingly, it can be seen that the viewing window 1503 of FIG. 15 and the viewing window 1603 of FIG. 16 are set differently.

According to an embodiment disclosed in the present application, by using an individually trained deep learning object recognition model and a deep-learned object identification model, it is possible to more quickly and accurately perform object identification and identity determination to provide tracking more effectively.

According to embodiment disclosed in the present application, by determining the same object based on similarity comparison for object identifiers derived from an object identification model, it is possible to perform object identity determination faster and with fewer resources.

The present invention described above is not limited by the above-described embodiments and the accompanying drawings, but is limited by the claims described below, and it can be readily understood by those skilled in the art that the configuration of the present invention may variously be changed and modified within the scope without departing from the technical spirit of the present invention.

[Acknowledgment]

The present invention was devised with the support of the following research projects supported by the Korean government.

Research Project Information

Department Name: Korea Tourism Organization

Research Project Name: Follow-up support for leading global tourism company

Project Name: Smart phone-linked automatic person/object recognition and tracking device Organizer: 3i Corporation Research Period: Mar. 4, 2022 to Dec. 31, 2022

What is claimed is:

1. A locked-on target based object tracking method performed in a portable terminal and provides an object tracking function to a recorded video captured for a forward view of the portable terminal, the method comprising:

setting a tracking object;

identifying an object which is existing in a frame image of the recorded video using a first artificial intelligence model and setting the object as a selected object, wherein the object and the tracking object belong to the same type; and determining whether the selected object set by the first artificial intelligence model and the tracking object are the same object using a second artificial intelligence model trained in a different way from the first artificial intelligence model, wherein the second artificial intelligence model is an artificial intelligence model pairwise-trained with a default image and a training image modified based on the default image to generate feature data representing identity between a reference object in the default image and a comparison object in the training image, and wherein the determining comprises:

generating a first feature vector for a reference object corresponding to the tracking object in the default image and a second feature vector for a comparison object corresponding to the selected object in the training image; and determining that the selected object and the tracking object are the same object when a similarity between the vectors meets a preset threshold.

2. The locked-on target based object tracking method of claim 1, wherein the first artificial intelligence model is an artificial intelligence model that is deep-learned with a plurality of training image sets corresponding to the type of the tracking object and identifies an object corresponding to the type of the tracking object existing in the frame image.

3. The locked-on target based object tracking method of claim 1, wherein the setting of the selected object includes:

displaying a bounding box for the selected object identified by the first artificial intelligence model; and cropping the bounding box and inputting a cropped bounding box to the second artificial intelligence model.

4. The locked-on target based object tracking method of claim 3, wherein the determining of whether the tracking object is the same object includes:

generating first feature data for a first bounding box including the selected object using the second artificial intelligence model; and generating second feature data for a second bounding box including the tracking object using the second artificial intelligence model.

5. The locked-on target based object tracking method of claim 4, wherein the determining of whether the tracking object is the same object further includes comparing the first feature data and the second feature data to determine the selected object and the tracking object belong to the same type.

6. The locked-on target based object tracking method of claim 1, wherein the default image and the training image are images including a person's whole body appearance.

7. The locked-on target based object tracking method of claim 1, further comprising:

when the selected object is the same object as the tracking object, resetting the selected object as the tracking object and performing object tracking based on the reset tracking object.

8. The locked-on target based object tracking method of claim 7, wherein the performing of the object tracking based on the reset tracking object includes:

setting a resolution of a viewing window to have a second resolution lower than a first resolution of the frame image; and setting a partial area of the selected frame image including the reset tracking object as the viewing window based on the reset tracking object.

9. The locked-on target based object tracking method of claim 8, wherein the performing of the object tracking based on the reset tracking object further includes displaying the viewing window based on a user display interface.

10. A portable terminal comprising:

a memory configured to store one or more instructions; and at least one processor configured to execute the one or more instructions stored in the memory, wherein the at least one processor executes the one or more instructions to:

receive a recorded video captured at a first resolution from a camera unit;

set a tracking object;

identify an object which is existing in a frame image of the recorded video using a first artificial intelligence model and set the object as a selected object, wherein the object and the tracking object belong to the same type; and determine whether the selected object set by the first artificial intelligence model and the tracking object are the same object using a second artificial intelligence model trained in a different way from the first artificial intelligence model, wherein the second artificial intelligence model is an artificial intelligence model pairwise-trained with a default image and a training image modified based on the default image to generate feature data representing identity between a reference object in the default image and a comparison object in the training image, and wherein the determining comprises:

generating a first feature vector for a reference object corresponding to the tracking object in the default image and a second feature vector for a comparison object corresponding to the selected object in the training image; and determining that the selected object and the tracking object are the same object when a similarity between the vectors meets a preset threshold.

11. The portable terminal of claim 10, wherein the first artificial intelligence model is an artificial intelligence model that is deep-learned with a plurality of training image sets corresponding to a type of the tracking object and identifies an object corresponding to the type of the tracking object existing in the frame image.

12. The portable terminal of claim 10, wherein, when setting the selected object, the portable terminal displays a bounding box for the selected object identified by the first artificial intelligence model, and crops the bounding box and inputs a cropped bounding box to the second artificial intelligence model.

13. The portable terminal of claim 12, wherein, when determining whether the tracking object is the same object, the portable terminal generates:

first feature data for a first bounding box including the selected object using the second artificial intelligence model; and second feature data for a second bounding box including the tracking object using the second artificial intelligence model.

14. The portable terminal of claim 13, wherein, when determining whether the tracking object is the same object, the portable terminal compares the first feature data and the second feature data to determine the selected object and the tracking object belong to the same type.

15. The portable terminal of claim 10, wherein the default image and the training image are images including a person's whole body appearance.

16. The portable terminal of claim 10, wherein when the selected object is the same object as the tracking object, the portable terminal resets the selected object as the tracking object and performs object tracking based on the reset tracking object.

17. The portable terminal of claim 16, wherein, when performing the object tracking based on the reset tracking object, the portable terminal sets:

a resolution of a viewing window to have a second resolution lower than a first resolution of the frame image; and a partial area of the selected frame image including the reset tracking object as the viewing window based on the reset tracking object.

18. A non-transitory storage medium in which computer-readable instructions are stored, wherein, when executed by a portable terminal, the instructions cause the portable terminal to:

set a tracking object, identify an object which is existing in a frame image of a recorded video using a first artificial intelligence model and set the object as selected object, wherein the object and the tracking object belong to the same type, and determine whether the selected object set by the first artificial intelligence model and the tracking object are the same object using a second artificial intelligence model trained in a different way from the first artificial intelligence model, wherein the second artificial intelligence model is an artificial intelligence model pairwise-trained with a default image and a training image modified based on the default image to generate feature data representing identity between a reference object in the default image and a comparison object in the training image, and wherein the determining comprises:

generating a first feature vector for a reference object corresponding to the tracking object in the default image and a second feature vector for a comparison object corresponding to the selected object in the training image; and determining that the selected object and the tracking object are the same object when a similarity between the vectors meets a preset threshold.

19. The locked-on target based object tracking method of claim 1, wherein the second artificial intelligence further generates a first feature vector for the reference object and a second feature vector for the comparison object, respectively, and determines whether the comparison object is similar to the reference object using the first feature vector of the reference object and the second feature vector of the comparison object.

20. The portable terminal of claim 10, wherein the second artificial intelligence is further configured to:

generate a first feature vector for the reference object and a second feature vector for the comparison object, respectively; and determine whether the comparison object is similar to the reference object using the first feature vector of the reference object and the second feature vector of the comparison object.

\* \* \* \* \*